United States Patent [19]

Fredriksen

[11] 4,421,188

[45] Dec. 20, 1983

[54] SELF-PROPELLED MULTIPLE-PURPOSE AGRICULTURAL MACHINE WITH DISPLACEABLE DRIVER'S CABIN

[75] Inventor: Nils Fredriksen, Harsewinkel, Fed. Rep. of Germany

[73] Assignee: Claas OHG, Harsewinkel, Fed. Rep. of Germany

[21] Appl. No.: 279,039

[22] Filed: Jun. 30, 1981

[30] Foreign Application Priority Data

Jun. 30, 1980 [DE] Fed. Rep. of Germany ....... 3024650

[51] Int. Cl.³ ............................................. B62D 33/06
[52] U.S. Cl. .................................. 180/327; 180/89.13; 296/190
[58] Field of Search .............. 180/326, 327, 328, 329, 180/89.12, 89.13; 280/456 A, 461 A, DIG. 8; 296/190; 56/15.6, 228, DIG. 9; 182/2; 37/1

[56] References Cited

U.S. PATENT DOCUMENTS

| | | | |
|---|---|---|---|
| 3,572,759 | 3/1971 | Baugh | 280/461 A |
| 3,720,047 | 3/1973 | van der Lely | 180/327 X |
| 3,721,077 | 3/1973 | van der Lely | 56/15.6 |
| 3,731,745 | 5/1973 | Koch | 280/461 A |
| 3,891,264 | 6/1975 | Hunter et al. | 296/190 |
| 3,957,165 | 5/1976 | Smith | 180/327 X |
| 4,141,591 | 2/1979 | Spicer | 180/327 X |

Primary Examiner—Joseph F. Peters, Jr.
Assistant Examiner—Mitchell J. Hill
Attorney, Agent, or Firm—Michael J. Striker

[57] ABSTRACT

A self-propelled multiple-purpose agricultural machine, particularly a tractor, has a chassis, a driver's cabin movable relative to the chassis between at least two working positions and lowerable relative to the chassis to a third low position, at least one machine axle connected with the chassis and located at a predetermined height above a ground level, auxiliary frame connected with the machine axle and supporting the driver's cabin so that its supporting plane is located substantially at the height of the machine axle, and a plurality of control elements extending from the driver's cabin and formed of such a type and with such a length that the connection of the control elements with respective parts of the machine is guaranteed and does not need to be interrupted even when the driver's cabin is lowered to the third low position onto the auxiliary frame.

8 Claims, 1 Drawing Figure

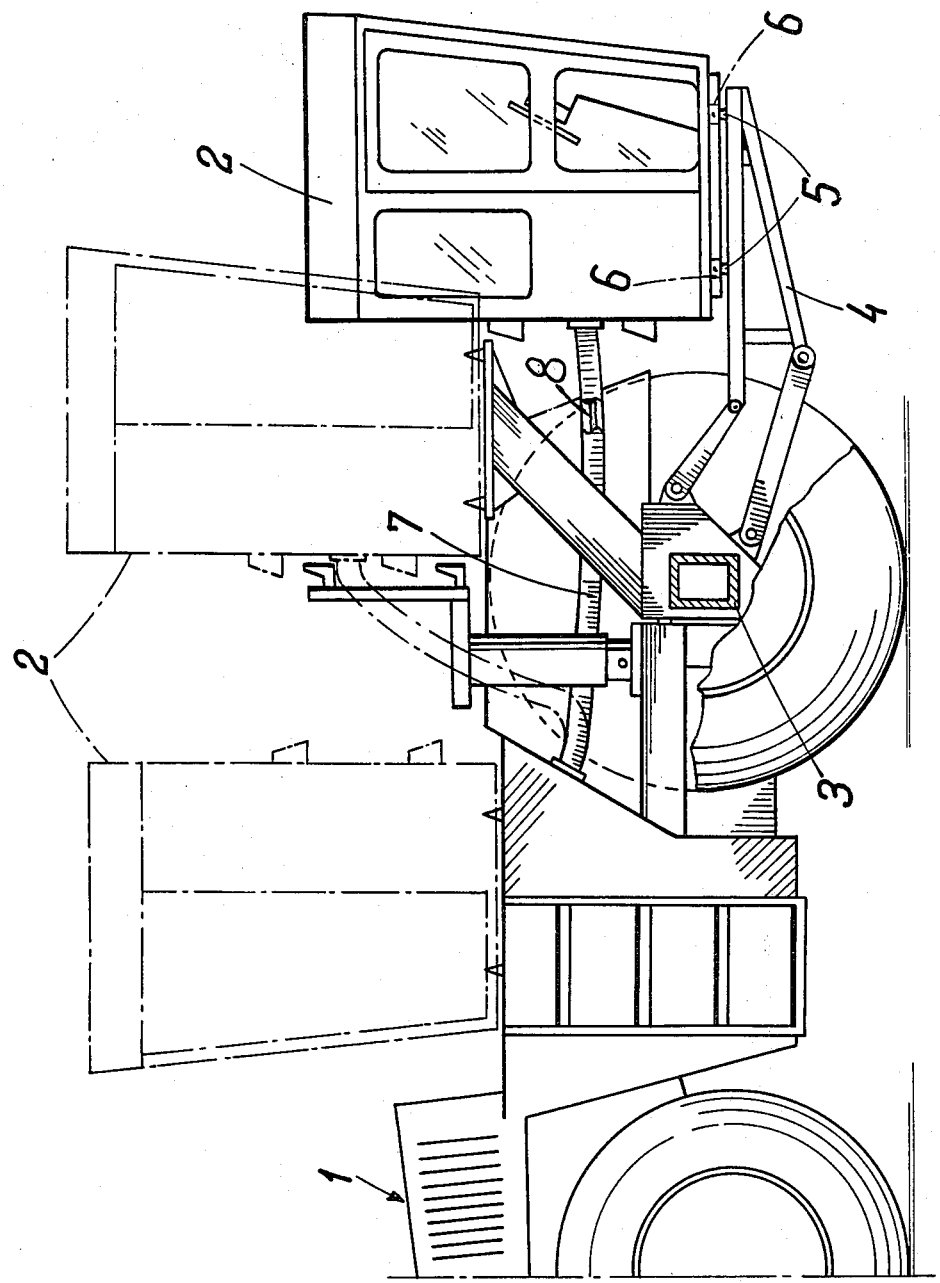

SELF-PROPELLED MULTIPLE-PURPOSE AGRICULTURAL MACHINE WITH DISPLACEABLE DRIVER'S CABIN

BACKGROUND OF THE INVENTION

The present invention relates to a self-propelled multiple-purpose agricultural machine, particularly a tractor, with a driver's cabin which is movable at least between two working positions.

Driver's cabins in multiple-purpose agricultural machines must be designed so that they can be turned back over the drive wheels to provide for optimum visibility conditions when, for example, a cultivator is mounted on the machine. However, the drive wheels of the machines with high output have great diameters, so that they reach the entire height of approximately 4 meters. The transportation of such machines by railroad or trucks is possible only when the driver's cabin is dismounted whereby all connections must be interrupted. This involves time-consuming mounting work at loading and unloading sites.

SUMMARY OF THE INVENTION

Accordingly, it is an object of the present invention to provide an agricultural machine which avoids the disadvantages of the prior art.

More particularly, it is an object of the present invention to provide a self-propelled multiple-purpose agricultural machine which does not require dismounting of the driver's cabin for transportation of the machine.

In keeping with these objects, and with others which will become apparent hereinafter, one feature of the present invention resides, briefly stated, in a self-propelled multiple-purpose agricultural machine in which an auxiliary frame is connected with a machine axle and serves for lowering the driver's cabin so that the supporting plane of the auxiliary frame is located at a height substantially corresponding to the height of the machine axle above the ground, and the control elements of the driver's cabin to the parts of the machine are formed so and have lengths such that their connection with the parts of the machine is guaranteed even when the auxiliary frame lowers the driver's cabin. The control elements may be formed as electrical, electronic, pneumatic and hydraulic control elements.

When the multiple-purpose self-propelled agricultural machine is designed in accordance with the present invention, it has the advantage that the driver's cabin can be lowered at loading locations in a simple manner by an available crane or stacker truck and thereby remains automatically maneuverable. The multiple-purpose agricultural machine can also run into a shipping freight car and out of the same.

For preventing the driver's cabin from sliding off from the auxiliary frame during the transportation, the auxiliary frame in accordance with a further advantageous feature of the present invention is provided with locking means. Advantageously, the locking means are formed as pins connected with the auxiliary frame, and arresting sleeves welded to the driver's cabin and fittable onto the pins of the auxiliary frame.

The novel features which are considered characteristic for the invention are set forth in the appended claims. The invention itself, however, both as to its construction and its method of operation, together with additional objects and advantages thereof, will be best understood from the following description of preferred embodiments when read in connection with the accompanying drawing.

BRIEF DESCRIPTION OF THE DRAWING

The single FIGURE of the drawing is a lateral view showing a self-propelled multiple-purpose agricultural machine in accordance with the present invention.

DESCRIPTION OF THE PREFERRED EMBODIMENT

A self-propelled multiple-purpose agricultural machine in accordance with the present invention is identified by reference numeral 1. The agricultural machine is provided with a driver's cabin 2 which during the utilization of the machine can be displaced to each of two working positions shown in dotted lines. The respective working position of the driver's cabin is selected in dependence upon whether the agricultural machine is utilized as a tractor or as a driving machine for a cultivator which is mounted on a rear swinging axle 3 of the machine.

An auxiliary frame 4 is mounted on the swinging machine axle 3 as can be seen from the FIGURE. The auxiliary frame 4 is connected with the driver's cabin 2 so as to support the latter when the driver's cabin must be lowered, for example for road transportation. Thereby, the available road shape is not exceeded by the machine. The displacement of the driver's cabin 2 from one of the two working positions onto the auxiliary frame 4 is performed, for example, by a crane, fork lift, or the like.

The swinging machine axle 3 has a predetermined height relative to ground level. The auxiliary frame 4 is designed so that its supporting plane for supporting the driver's cabin 2 is located substantially at the height corresponding to the height of the swinging machine axle 3.

The driver's cabin 2 is locked with the auxiliary frame 5. For this locking, locking elements are provided which include several conically upwardly decreasing pins 5 arranged on the auxiliary frame 4, on the one hand, and arresting sleeves 6 arranged on the driver's cabin 2, on the other hand. When the driver's cabin 2 is placed onto the auxiliary frame 4, the arresting sleeves 6 of the driver's cabin 2 are fitted onto the decreasing pins 5 of the auxiliary frame 4 so as to provide the above-mentioned locking between the driver's cabin 2 and the auxiliary frame 4.

A plurality of control and transmission elements 8 lead from the driver's cabin 2 to the respective parts of the machine. The control and transmission elements 8 are formed exclusively as electrical, electronic, pneumatic or hydraulic elements and have such a length that, when the driver's cabin 2 is lowered onto the auxiliary frame 4, these elements need not be removed or interrupted. The control and transmission elements 8 are accommodated in a protected manner in a flexible hose 7 which leads from the driver's cabin 2 to the parts of the machine. As a result of this, the agricultural machine can move with its own power into a railroad car or out of the latter. Thereby the time-consuming dismounting and mounting of the control and transmission elements is dispensed with.

It will be understood that each of the elements described above, or two or more together, may also find a useful application in other types of contructions differing from the types desribed above.

While the invention has been illustrated and described as embodied in a self-propelled multiple-purpose agricultural machine, particularly a tractor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A self-propelled multiple-purpose agricultural machine, particularly a tractor, comprising a chassis; a driver's cabin movable relative to said chassis between at least two working positions and lowerable to a third lower transporting position; at least one machine axle connected with said chassis and located at a predetermined height above a ground level; an auxiliary frame detachably mountable on said machine axle when the machine is to be transported and supporting said driver's cabin when said driver's cabin is lowered from one of said working positions to said third transporting position so that said driver's cabin becomes located in a supporting plane substantially at a height corresponding to the height of said machine axle; and a plurality of control elements extending from said driver's cabin, said control elements being formed so and having a length such that their connection with respective parts of the machine is guaranteed and does not need to be interrupted even when said driver's cabin is lowered to said third transporting position so that for transportation with said lowered cabin the machine can propel itself.

2. An agricultural machine as claimed in claim 1, wherein said driver's cabin is arranged to be removed from said chassis and placed onto said auxiliary frame, when it is moved from said one working position to said third transporting position.

3. An agricultural machine as defined in claim 1, wherein said control elements extending from said driver's cabin are formed as electrical control elements.

4. An agricultural machine as defined in claim 1, wherein said control elements extending from said driver's cabin are formed as electronic control elements.

5. An agricultural machine as defined in claim 1, wherein said control elements extending from said driver's cabin are formed as pneumatic control elements.

6. An agricultural machine as defined in claim 1, wherein said control elements extending from said driver's cabin are formed as hydraulic control elements.

7. An agricultural machine as defined in claim 1, wherein said machine axle with which said auxiliary frame is connected is a rear machine axle.

8. An agricultural machine as defined in claim 1, wherein said auxiliary frame which supports said driver's cabin is provided with locking means.

* * * * *